United States Patent
Yoon et al.

(10) Patent No.: US 10,174,224 B2
(45) Date of Patent: Jan. 8, 2019

(54) ADHESIVE COMPOSITION FOR TOUCH PANEL, ADHESIVE FILM, AND TOUCH PANEL

(71) Applicant: LG Chem, Ltd., Seoul (KR)

(72) Inventors: Chan Oh Yoon, Cheongju-si (KR); Eun Kyung Park, Seoul (KR); Jaegwan Lee, Daejeon (KR); Jang Soon Kim, Seongnam-si (KR); Bu Gi Jung, Anyang-si (KR); Sung Chan Park, Seoul (KR); Won Ho Kim, Seoul (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/421,023

(22) PCT Filed: Aug. 7, 2013

(86) PCT No.: PCT/KR2013/007131
§ 371 (c)(1),
(2) Date: Feb. 11, 2015

(87) PCT Pub. No.: WO2014/027788
PCT Pub. Date: Feb. 20, 2014

(65) Prior Publication Data
US 2015/0232707 A1 Aug. 20, 2015

(30) Foreign Application Priority Data
Aug. 16, 2012 (KR) .......... 10-2012-0089713

(51) Int. Cl.
*C09J 133/14* (2006.01)
*C09J 175/08* (2006.01)
(Continued)

(52) U.S. Cl.
CPC .......... *C09J 7/0285* (2013.01); *C09J 133/14* (2013.01); *C09J 175/08* (2013.01); *G06F 1/1643* (2013.01);
(Continued)

(58) Field of Classification Search
None
See application file for complete search history.

(56) References Cited

U.S. PATENT DOCUMENTS

| | | | |
|---|---|---|---|
| 2004/0191509 A1* | 9/2004 | Kishioka | B32B 7/10 428/354 |
| 2010/0080991 A1* | 4/2010 | Kishioka | C09J 7/0217 428/355 R |

(Continued)

FOREIGN PATENT DOCUMENTS

| | | | | |
|---|---|---|---|---|
| CN | 102585713 A | 7/2012 | | |
| JP | 2011-111572 A | * 6/2011 | ............... | C09J 7/00 |

(Continued)

OTHER PUBLICATIONS

Machine translation of JP 2011-111572 A.*

(Continued)

*Primary Examiner* — Alicia Chevalier
*Assistant Examiner* — Thomas A Mangohig
(74) *Attorney, Agent, or Firm* — Lerner, David, Littenberg, Krumholz & Mentlik, LLP (57) ABSTRACT

Provided is a urethane adhesive composition for a touch panel having a glass transition temperature between −20° C. to −50° C., and which, as a cured composition, has an elasticity of 50,000 Pa to 70,000 Pa at 60° C. to 80° C.

12 Claims, 7 Drawing Sheets

(51) Int. Cl.
*G06F 1/16* (2006.01)
*C09J 7/02* (2006.01)
(52) U.S. Cl.
CPC ....... *G06F 1/1692* (2013.01); *Y10T 428/1476* (2015.01); *Y10T 428/2848* (2015.01); *Y10T 428/2896* (2015.01)

(56) References Cited

U.S. PATENT DOCUMENTS

| | | | |
|---|---|---|---|
| 2011/0028583 A1* | 2/2011 | Smith | C08F 2/48 522/31 |
| 2012/0115976 A1* | 5/2012 | Igarashi | C09J 4/06 522/120 |
| 2013/0337260 A1* | 12/2013 | Tapio | C09D 4/00 428/355 AC |

FOREIGN PATENT DOCUMENTS

| | | | |
|---|---|---|---|
| JP | 2011256264 A | 12/2011 | |
| KR | 20110009641 A | 1/2011 | |
| KR | 20120044013 A | 5/2012 | |
| KR | 20120056230 A | 6/2012 | |
| KR | 20120078589 A | 7/2012 | |
| KR | 20120088955 A | 8/2012 | |
| TW | 201221605 A | 6/2012 | |
| TW | 201231608 A | 8/2012 | |
| WO | 2011119180 A1 | 9/2011 | |
| WO | 2012070807 A2 | 5/2012 | |
| WO | 2012070887 A2 | 5/2012 | |
| WO | WO 2012/082706 A2 * | 6/2012 | ............... C09D 4/00 |
| WO | 2013173976 A1 | 11/2013 | |

OTHER PUBLICATIONS

International Search Report for PCT/KR2013/007131 dated Sep. 30, 2013.
European Search Report dated May 6, 2015 in connection with the counterpart European Patent Application No. 13879358.3.
Chinese Office Action dated Dec. 28, 2015 in connection with the counterpart Chinese Patent Application No. 201380042890.6.

* cited by examiner

ADHESIVE COMPOSITION FOR TOUCH PANEL, ADHESIVE FILM, AND TOUCH PANEL

CROSS REFERENCE TO RELATED APPLICATION

This application claims the priority of Korean Patent Application No. 10-2012-0089713 filed on Aug. 16, 2012 in the Korean Patent and Trademark Office. Further, this application is the National Phase application of International Application No. PCT/KR2013/007131 filed on Aug. 7, 2013, which is incorporated herein by reference in its entirety.

TECHNICAL FIELD

The present invention relates to an adhesive composition for touch panels, an adhesive film, and a touch panel.

BACKGROUND ART

Recently, electronic devices, such as PDAs, mobile telecommunication terminals, or navigation systems for vehicles, have created a huge market. In such electronic devices, examples of technical goals include slimness, light weight, low power consumption, high resolution, and high brightness. For electronic devices having an input controller provided with a touchscreen or a touch panel switch, a transparent conductive plastic film is used to achieve light weight and prevent cracking. An example of the film includes a film which includes a base of a polyethylene terephthalate (PET) film, and a conductive layer of indium tin oxide (ITO) formed on one surface of the base. The film is stacked on a conductive glass, a stiffener, or a decorative film via an adhesive layer. The adhesive layer requires various properties, such as durability and the like.

DISCLOSURE

Technical Problem

It is one aspect of the present invention to provide an adhesive composition for touch panels which exhibits an excellent anti-bending property when interposed between films having different thermal shrinkages and expansions at high temperature.

It is another aspect of the present invention to provide an adhesive film fabricated using the adhesive composition for touch panels as set forth above.

It is a further aspect of the present invention to provide a touch panel employing the adhesive film as set forth above.

Technical Solution

In accordance with one aspect of the present invention, a urethane-based adhesive composition for touch panels has a glass transition temperature of about −20° C. to about −50° C., wherein a cured product of the composition has a modulus of about 50,000 Pa to about 70,000 Pa, as measured at about 60° C. to about 80° C.

The urethane-based adhesive composition for touch panels may include a urethane-based curable compound, a (meth)acrylic acid ester monomer, and a crosslinkable monomer.

The (meth)acrylic acid ester monomer may be present in an amount of about 5 parts by weight to about 100 parts by weight based on 100 parts by weight of the urethane-based curable compound.

The (meth)acrylic acid ester monomer may be alkyl (meth)acrylate, and the alkyl of the alkyl(meth)acrylate may be a linear or branched $C_1$ to $C_{14}$ alkyl.

The (meth)acrylic acid ester monomer may include one selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isobornyl (meth)acrylate, isononyl (meth)acrylate, and combinations thereof.

The crosslinkable monomer may include one selected from the group consisting of a hydroxy group-containing monomer, a carboxyl group-containing monomer, a nitrogen-containing monomer, and combinations thereof.

The crosslinkable monomer may include one selected from the group consisting of 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate, 2-hydroxypropyleneglycol (meth)acrylate, acrylic acid, methacrylic acid, 2-(meth)acryloyloxy acetic acid, 3-(meth)acryloyloxy propyl acid, 4-(meth)acryloyloxy butyl acid, an acrylic acid dimer, itaconic acid, maleic acid, 2-isocyanatoethyl (meth)acrylate, 3-isocyanatopropyl (meth)acrylate, 4-isocyanatobutyl (meth)acrylate, (meth)acrylamide, N-vinyl pyrrolidone, N-vinyl caprolactam, and combinations thereof.

The urethane-based adhesive composition for touch panels may further include a photoinitiator.

The photoinitiator may include one selected from the group consisting of benzoin initiators, hydroxyketone initiators, aminoketone initiators, caprolactam initiators and combinations thereof.

In accordance with another aspect of the present invention, an adhesive film may include an adhesive layer including a cured product of the urethane-based adhesive composition for touch panels as set forth above.

The adhesive layer may have a thickness of about 25 μm to about 300 μm.

The adhesive film may have a degree of deformation ranging from about 0.08 mm to about 0.11 mm, as measured after application of 1000 gf to the adhesive film for 5 minutes using a texture analyzer (TA XT Plus, Stable Micro systems Co., Ltd.).

The adhesive film may include a base layer and an adhesive layer stacked on one or both sides of the base layer.

The base layer may include one selected from the group consisting of polyethylene terephthalate, polytetrafluoroethylene, polyethylene, polypropylene, polybutene, polybutadiene, a vinyl chloride copolymer, polyurethane, ethylene-vinyl acetate, an ethylene-propylene copolymer, an ethylene-ethyl acrylate copolymer, an ethylene-methyl acrylate copolymer, polyimide, and combinations thereof.

The adhesive layer and a release film may be sequentially staked on one or both sides of the base layer.

In accordance with a further aspect of the present invention, a touch panel includes a conductive plastic film with a conductive layer formed on one surface thereof; and an adhesive layer attached to the conductive layer and including a cured product of the adhesive composition for touch panels as set forth.

The conductive plastic film may be a polyethylene terephthalate film with an ITO (conductive metal oxide) layer formed on one surface thereof.

Advantageous Effects

The adhesive composition for touch panels can provide an adhesive film which exhibits an excellent anti-bending property when interposed between films having different thermal shrinkages and expansions at high temperature.

BEST MODE

Hereinafter, embodiments of the present invention will be described in detail with reference to the accompanying drawings. It should be understood that the following embodiments are provided for illustration only and are not to be construed in any way as limiting the present invention. The scope of the present invention should be defined only by the accompanying claims and equivalents thereof.

For clarity, portions irrelevant to the description are omitted for clarity. Like components will be denoted by like reference numerals throughout the specification.

In the drawings, thicknesses are enlarged to clearly express various layers and regions. In the drawings, the thicknesses of some layers and regions are exaggerated for convenience of description.

It will be understood that when an element such as a layer, a film, an area, a plate, etc. is referred to as being formed on another element, it can be directly formed on the other element, or an intervening layer(s) may also be present. In contrast, when an element is referred to as being "directly formed" on another element, there are no intervening elements therebetween.

In accordance with one aspect of the present invention, there is provided a urethane-based adhesive composition for touch panels having a glass transition temperature of about −20° C. to about −50° C., wherein a cured product of the composition has a modulus of about 50,000 Pa to about 70,000 Pa, as measured at about 60° C. to about 80° C. The urethane-based adhesive composition for touch panels may be cured to be formed into an adhesive layer interposed between two films. In order to stack a transparent conductive film on a window glass of a display of mobile phones, tablet PCs, and the like, the adhesive layer may be interposed therebetween. Here, since the window glass formed of a plastic base exhibits different thermal shrinkage and expansion than the transparent conductive film, the window glass can be bent towards one side or the other side, for example, in a direction of the plastic base. The urethane-based adhesive composition for touch panels having a low glass transition temperature can effectively suppress such bending.

Furthermore, the urethane-based adhesive composition for touch panels is composed to have high modulus at high temperature so as to prevent reduction in peeling force due to a low glass transition temperature.

Modulus at high temperature may be controlled by adjusting a degree of cure of the urethane-based adhesive composition for touch panels. Specifically, the urethane-based adhesive composition for touch panels may be cured at a degree of cure from about 70 wt % to about 90 wt % to form the adhesive layer.

By adjusting the composition of the urethane-based adhesive composition for touch panels such that the glass transition temperature of the urethane-based adhesive composition falls within the range as set forth above, and by increasing the modulus at high temperature of the cured adhesive composition up to the aforementioned range, bending of the window glass can be effectively suppressed, which can occur when the adhesive layer formed of the cured adhesive composition is interposed between the window glass and the transparent conductive film. In order to increase the modulus of the cured adhesive composition, adjustment of the degree of cure or the glass transition temperature, or addition of a material having strong adhesion such as a urethane-based oligomer may be employed.

Within the aforementioned range of glass transition temperature, the urethane-based adhesive composition for touch panels can provide excellent stress relaxation while maintaining balance of adhesion properties. In addition, within the aforementioned range of modulus, the urethane-based adhesive composition for touch panels can suitably secure both stress relaxation and reliability.

Furthermore, the urethane-based adhesive composition for touch panels can improve reliability with respect to outgassing of the window glass formed of the plastic base, and allow overall stress relaxation, thereby effectively suppressing bending of the plastic base.

In one embodiment, the urethane-based adhesive composition for touch panels may include a urethane-based curable compound, a (meth)acrylic acid ester monomer, and a crosslinkable monomer.

The urethane-based curable compound refers to monomers, oligomers, and prepolymers for formation of urethane-based curable resins. Specifically, as the urethane-based curable compound, a prepolymer consisting of a urethane acrylate oligomer and an acrylate monomer, and a functional acrylate monomer are used. For example, the urethane acrylate oligomer may include an oligomer having a weight-average molecular weight of about 30,000 to about 100,000.

In another embodiment, the adhesive composition for touch panels may include about 5 parts by weight to about 100 parts by weight of the (meth)acrylic acid ester monomer.

The (meth)acrylic acid ester monomer may be, for example alkyl(meth)acrylate, without being limited thereto. The alkyl of the alkyl(meth)acrylate may be a linear or branched $C_1$ to $C_{14}$ alkyl, specifically a $C_1$ to $C_8$ alkyl. Within this range of carbon number of the alkyl (meth)acrylate, the cured adhesive composition for touch panels can be adjusted to have appropriate cohesion, glass transition temperature, and adhesion. Specifically, the (meth) acrylic acid ester monomer may include one selected from the group consisting of methyl (meth)acrylate, ethyl (meth)

acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isobornyl (meth)acrylate, isononyl (meth)acrylate, and combinations thereof.

The crosslinkable monomer refers to a monomer including both a copolymerizable functional group and a crosslinkable functional group.

The crosslinkable monomer may include one selected from the group consisting of a hydroxy group-containing monomer, a carboxyl group-containing monomer, a nitrogen-containing monomer, and combinations thereof.

Specifically, the crosslinkable monomer may include one selected from the group consisting of 2-hydroxyethyl (meth) acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol(meth)acrylate, 2-hydroxypropyleneglycol (meth)acrylate, acrylic acid, methacrylic acid, 2-(meth)acryloyloxy acetic acid, 3-(meth)acryloyloxy propyl acid, 4-(meth)acryloyloxy butyl acid, an acrylic acid dimer, itaconic acid, maleic acid, 2-isocyanatoethyl(meth)acrylate, 3-isocyanatopropyl(meth)acrylate, 4-isocyanatobutyl(meth)acrylate, (meth)acrylamide, N-vinyl pyrrolidone, N-vinyl caprolactam, and combinations thereof.

The adhesive composition for touch panels can be controlled in terms of glass transition temperature by adjusting the amount of each component.

The adhesive composition for touch panels is a photocurable composition and may further include a photoinitiator to adjust a degree of polymerization. The photoinitiator may be present in an amount of about 0.01 parts by weight to about 10 parts by weight based on 100 parts by weight of the urethane-based curable compound. The photoinitiator may be any initiator so long as the initiator can generate radicals by light irradiation and thus initiate polymerization. The photoinitiator may include one selected from the group consisting of benzoin initiators, hydroxyketone initiators, aminoketone initiators, caprolactam initiators and combinations thereof.

The adhesive composition for touch panels may further include at least one additive selected from the group consisting of epoxy resins, crosslinking agents, UV stabilizers, antioxidants, toning agents, reinforcing agents, fillers, defoamers, surfactants, plasticizers, and combinations thereof, without deviating from the invention.

In accordance with another aspect of the present invention, there is provided an adhesive film including an adhesive layer including a cured product of the adhesive composition for touch panels as set forth above.

Figure 1:
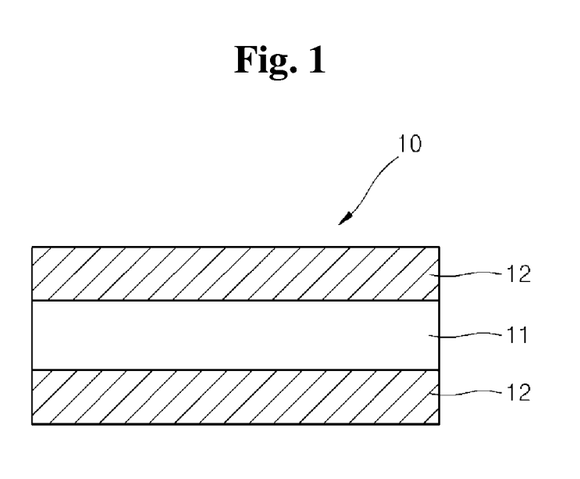
FIG. 1 is a schematic sectional view of an adhesive film according to one embodiment of the present invention.

FIG. 1 is a sectional view of an adhesive film 10 including an adhesive layer 12 according to one embodiment of the present invention. In FIG. 1, the adhesive film 10 includes a base layer 11 and an adhesive layer 12 formed on both surfaces of the base layer 11. However, the adhesive film 10 may include the adhesive layer 12 formed only on one surface of the base layer 11. In addition, as needed, the adhesive film 10 may include a sheet-shaped adhesive layer 12 alone without the base layer.

The adhesive layer 12 may have a modulus of about 50,000 Pa to about 70,000 Pa, as measured at about 60° C. to about 80° C. When the modulus of the adhesive layer formed of the cured adhesive composition for touch panels falls within this range at high temperature, it is possible to effectively suppress bending, as described above. For example, the adhesive film may have a degree of deformation ranging from about 0.08 mm to about 0.11 mm, as measured after application of 1000 gf to the adhesive film for 5 minutes using a texture analyzer (TA XT Plus, Stable Micro systems Co., Ltd.).

The adhesive layer 12 may have a glass transition temperature of about −20° C. to about −50° C.

The adhesive film 10 may be prepared by applying the adhesive composition for touch panels to the base layer 11, and photocuring by light irradiation to form the adhesive layer 12.

As used herein, the term "light irradiation" refers to irradiation with electromagnetic waves which can influence photoinitiators or polymerizable compounds to cause polymerization, and the electromagnetic waves are used as a generic term for particle beams, such as α-particle beams, proton beams, neutron beams, and electron beams, as well as microwaves, infrared rays, ultraviolet rays, X-rays, and γ-rays.

In order to form the adhesive layer 12 by curing the adhesive composition for touch panels, any suitable method may be used without limitation. For example, the adhesive layer 12 may be formed by introducing the adhesive composition for touch panels or a coating solution obtained by adding a solvent thereto into a casting mold, or applying the adhesive composition or the coating solution to an appropriate processing base using a bar coater, followed by curing.

Since curing is performed after sufficiently removing components, which are volatile or can cause bubbling, from the adhesive composition or the coating solution, it is possible to provide appropriate crosslinking density, molecular weight, modulus, and the like for the cured product, and to prevent a risk that bubbles will grow in an adhesive interface to form scattering materials inside the composition. Curing of the adhesive composition or the coating solution thereof may be performed by, for example, irradiating a coating layer formed of the adhesive composition for touch panels or the coating solution thereof with UV rays, or aging the coating layer under predetermined conditions, without being limited thereto.

The adhesive layer 12 may have a thickness of about 25 µm to about 300 µm, specifically about 100 µm to about 200 µm. Within this range, the adhesive layer can be applied to thin touch panels or touchscreens while realizing an adhesive film 10 having excellent durability.

As the base layer 11, any plastic film typically used in the art may be used. For example, the base layer 11 may include one selected form the group consisting of polyethylene terephthalate, polytetrafluoroethylene, polyethylene, polypropylene, polybutene, polybutadiene, a vinyl chloride copolymer, polyurethane, ethylene-vinyl acetate, an ethylene-propylene copolymer, an ethylene-ethyl acrylate copolymer, an ethylene-methyl acrylate copolymer, polyimide, and combinations thereof. Specifically, the base layer 11 may include a polyethylene terephthalate film, without being limited thereto.

The base layer 11 may have a thickness of about 25 µm to about 300 µm, specifically about 30 µm to about 200 µm. Within this range, the base layer 11 can be applied to thin touch panels or touchscreens while realizing an adhesive film 10 having excellent durability.

Figure 2:
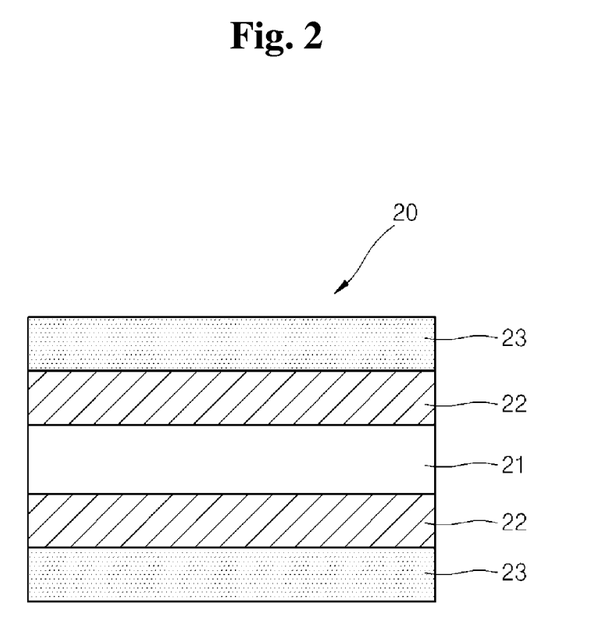
FIG. 2 is a schematic sectional view of an adhesive film according to another embodiment of the present invention.

FIG. 2 is a sectional view of an adhesive film 20 according to another embodiment of the present invention.

The adhesive film 20 may further include a release film 23 on the adhesive layer 22, as needed. In FIG. 2, the adhesive film 20 includes a base layer 21; adhesive layers 22 stacked on both surfaces of the base layer 21; and a release film 23 stacked on each of the adhesive layers 22.

The release film 23 may be formed by, for example, release treatment on one surface of various plastic films used as the base layers 11, 21. Examples of a release agent used in release treatment may include alkyd release agents, silicone release agents, fluorine release agents, unsaturated ester release agents, polyolefin release agents, wax release agents, and the like. In terms of heat resistance, the release agent preferably includes an alkyd release agent, a silicone release agent, or a fluorine release agent, without being limited thereto.

The thickness of the release film 23 may be selected depending upon applications thereof without limitation. For example, the release film 23 may have a thickness of about 10 μm to 100 μm, specifically about 30 μm to 90 μm, more specifically about 40 μm to 80 μm.

In accordance with a further aspect of the invention, there is provided a touch panel which includes a conductive plastic film with a conductive layer formed on one surface thereof; and an adhesive layer attached to the conductive layer and including a cured product of the adhesive composition for touch panels.

The touch panel may be, for example, a capacitive touch panel. In addition, the touch panel may be structured and formed in any typical fashion known in the art so long as the adhesive composition can be applied to the touch panel.

Figure 3:
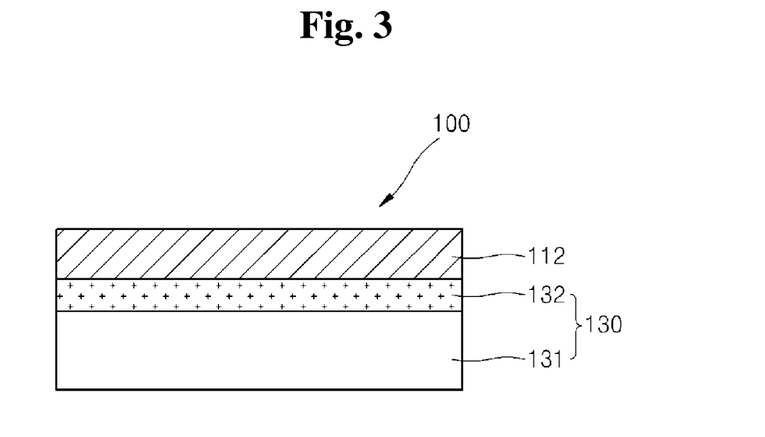
FIG. 3 is a schematic sectional view of a touch panel according to further embodiments of the present invention.
Figure 4:
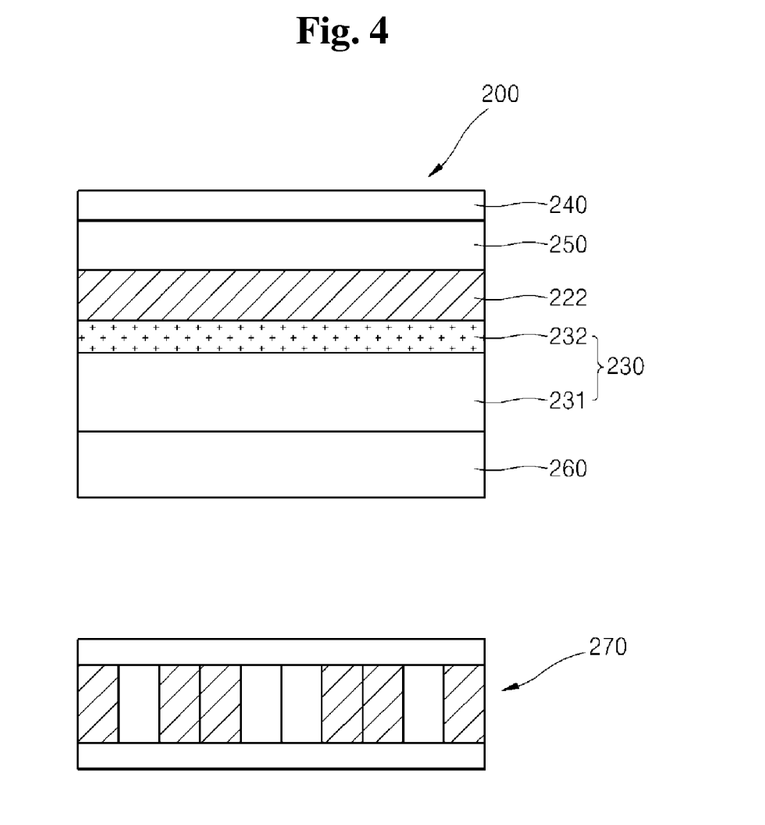
FIG. 4 is a schematic sectional view of a touch panel according to still further embodiments of the present invention.

FIGS. 3 and 4 each depict a schematic sectional view of touch panels 100 and 200 according to further embodiments of the present invention.

In FIG. 3, the touch panel 100 may include: a conductive plastic film 130 including a plastic base layer 131 and a conductive layer 132 formed on one surface of the plastic base layer 131; and an adhesive layer 112 attached to one surface of the conductive layer 132 of the conductive plastic film 130.

As the conductive plastic film 130, any conductive film known in the art may be used. For example, the conductive plastic film 130 may be a transparent plastic film with an ITO (conductive metal oxide) electrode layer formed on one side thereof. Specifically, the transparent plastic film, which forms the plastic base layer 131, may include polyethylene terephthalate films, polytetrafluoroethylene films, polyethylene films, polypropylene films, polybutene films, polybutadiene films, vinyl chloride copolymer films, polyurethane films, ethylene-vinyl acetate films, ethylene-propylene copolymer films, ethylene-ethyl acrylate copolymer films, ethylene-methyl acrylate copolymer films, or polyimide films, without being limited thereto. More specifically, the plastic base layer 131 may be a polyethylene terephthalate (PET) film.

As shown in FIG. 4, the touch panel 200 may include, from top to bottom, an anti-reflection coating 240, a protective film 250, an adhesive layer 222, a conductive plastic film 230 including a plastic base layer 231 and a conductive layer 232 formed on one surface of the plastic base layer, and a transparent substrate 260. In addition, the touch panel 200 including these layers may be attached to a display 270, such as a liquid crystal display (LCD).

In FIG. 4, the adhesive layer 222 including the cured product of the adhesive composition for touch panels may be attached to an upper portion of the conductive layer 232 of the conductive plastic film 230.

In the structure shown in FIG. 4, all features, except for the adhesive layer 222 including the cured product of the adhesive composition for touch panels, are not limited as to the type and forming method thereof, and may employ any typical component known in the art.

Hereinafter, the present invention will be described in more detail with reference to some examples. It should be understood that these examples are provided for illustration only and are not to be construed in any way as limiting the present invention.

EXAMPLES

Example 2

Polypropylene glycol (PPG, Mw=2,000) was polymerized with isophorone diisocyanate (IPDI), thereby preparing a urethane-based curable oligomer (Mw=40,000.about.100,000). 40 parts by weight of the urethane-based curable oligomer, 35 parts by weight of 2-ethylhexyl acrylate (2-EHA), and 25 parts by weight of hydroxyethyl acrylate (HEA) were mixed, followed by adding 1-hydroxy cyclohexyl phenyl ketone (Irgacure 184, HCPK), as a photoinitiator, and a coupling agent to the mixture, thereby preparing an adhesive composition. Thereafter, the glass transition temperature of the adhesive composition was measured by differential scanning calorimetry (DSC). Results are shown in Table 1. The adhesive composition was coated onto one surface of a polyethylene terephthalate film (thickness: 75 μm) to a thickness of 100 μm using a bar coater after UV curing. Then, the adhesive composition-coated film was cured by irradiation with UV rays for 10 minutes using a UV lamp, thereby preparing an adhesive film.

Examples 1 and 3

Adhesive films were prepared in the same manner as in Example 2 except that the amount of each component of the adhesive composition was changed as listed in Table 1.

Comparative Examples 1 to 3

Polypropylene glycol (PPG, Mw=2,000) was polymerized with isophorone diisocyanate (IPDI), thereby preparing a urethane-based curable oligomer (Mw=40,000.about.100,000). The urethane-based curable oligomer, 2-ethylhexyl acrylate (2-EHA), and isobornyl acrylate (IBOA) were mixed, followed by adding 1-hydroxy cyclohexyl phenyl ketone (Irgacure 184, HCPK), as a photoinitiator, and a coupling agent to the mixture, thereby preparing an adhesive composition. Thereafter, the glass transition temperature of the adhesive composition was measured by differential scanning calorimetry (DSC). Results are shown in Table 1. The adhesive composition was coated on one surface of a polyethylene terephthalate film (thickness: 75 μm) to a thickness of 100 μm using a bar coater after UV curing. Then, the adhesive composition-coated film was cured by irradiation with UV rays for 10 minutes using a UV lamp, thereby preparing an adhesive film.

Comparative Example 4

65 parts by weight of 2-ethylhexyl acrylate (2-EHA), 15 parts by weight of isobornyl acrylate (IBOA), and 20 parts by weight of hydroxyethyl acrylate were mixed, followed by adding 1-hydroxy cyclohexyl phenyl ketone (Irgacure 184, HCPK), as a photoinitiator, and a coupling agent to the mixture, thereby preparing an adhesive composition. Thereafter, the glass transition temperature of the adhesive composition was measured by differential scanning calorimetry (DSC). Results are shown in Table 1. The adhesive composition was coated on one surface of a polyethylene terephthalate film (thickness: 75 μm) to a thickness of 100 μm using a bar coater, after UV curing. Then, the adhesive composition-coated film was cured by irradiation with UV rays for 10 minutes using a UV lamp, thereby preparing an adhesive film.

TABLE 1

|  | Examples (parts by weight) | | | Comparative Examples (parts by weight) | | | |
| --- | --- | --- | --- | --- | --- | --- | --- |
|  | 1 | 2 | 3 | 1 | 2 | 3 | 4 |
| Urethane oligomer | 40 | 40 | 40 | 40 | 40 | 40 | — |
| 2-EHA | 30 | 35 | 40 | 30 | 35 | 40 | 65 |
| HEA | 30 | 25 | 20 | — | — | — | 20 |
| IBOA | — | — | — | 30 | 25 | 20 | 15 |
| Glass transition temperature (° C.) | −25 | −30 | −35 | −10 | −15 | −20 | −35 |

Property Evaluation of Adhesive Film

The adhesive films prepared in Examples 1 to 3 and Comparative Examples 1 to 4 were evaluated as to the following properties. Results are shown in Table 2.

<Reliability (Temperature: 85° C., Humidity: 85%)>

Each of the adhesive films prepared in Examples 1 to 3 and Comparative Examples 1 to 4 was attached between a plastic base and an ITO film, and left under high temperature and high humidity conditions (temperature: 85° C., humidity: 85%) for 24 hours. Then, in appearance evaluation, the specimen was observed with the naked eye to determine whether the specimen suffered from bubbling, followed by evaluating reliability based on the following criteria. Results are shown in Table 2.

Good: Little or No bubbling

Bad: Severe bubbling

TABLE 2

|  | Examples (parts by weight) | | | Comparative Examples (parts by weight) | | | |
| --- | --- | --- | --- | --- | --- | --- | --- |
|  | 1 | 2 | 3 | 1 | 2 | 3 | 4 |
| Modulus at 80° C. (Pa) | 70,000 | 65,000 | 55,000 | 10,500 | 100,000 | 95000 | 55,000 |
| Degree of bending (mm) | 0.3 | 0.25 | 0.2 | 0.6 | 0.5 | 0.4 | 0.2 |
| Reliability (bubbling) | Good | Good | Good | Good | Good | Good | Bad |

<Modulus>

Shear storage modulus was measured using a rheometer (ARES-G2, TA Instruments) under the following conditions.

Frequency: 1 rad/sec, Strain: 10%, Temperature: 0° C.-100° C.

Figure 5:
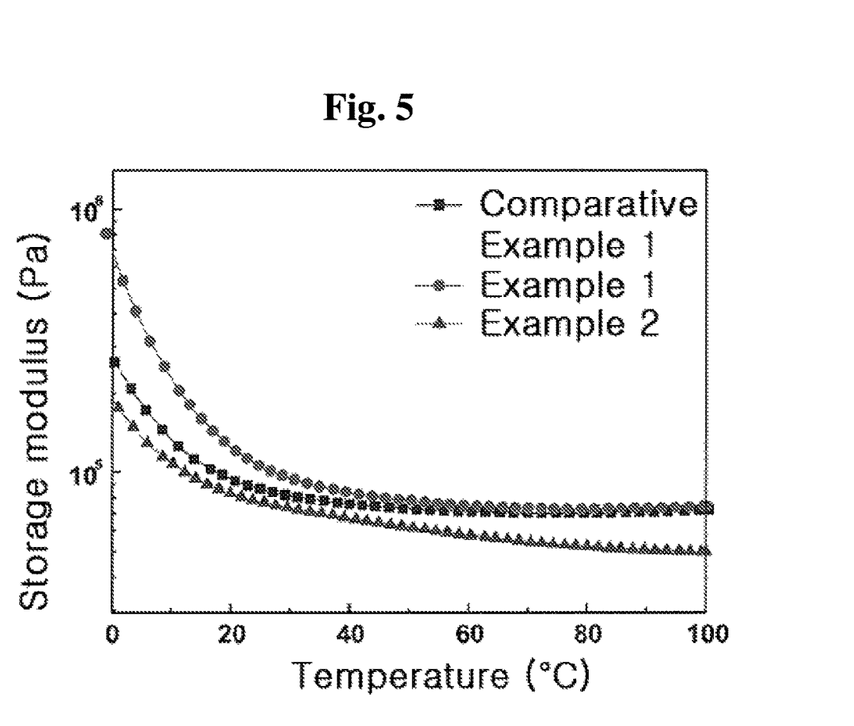
FIG. 5 is a graph showing modulus as a function of temperature for adhesive films prepared in Examples 1 to 2 and Comparative Example 1.

Sample Geometry: Circular sample with a thickness of 600 μm or more and a diameter of 10 mm FIG. 5 is a graph showing modulus as a function of temperature.

Modulus values at 80° C. are shown in Table 2.

<Creep Test>

Figure 6:
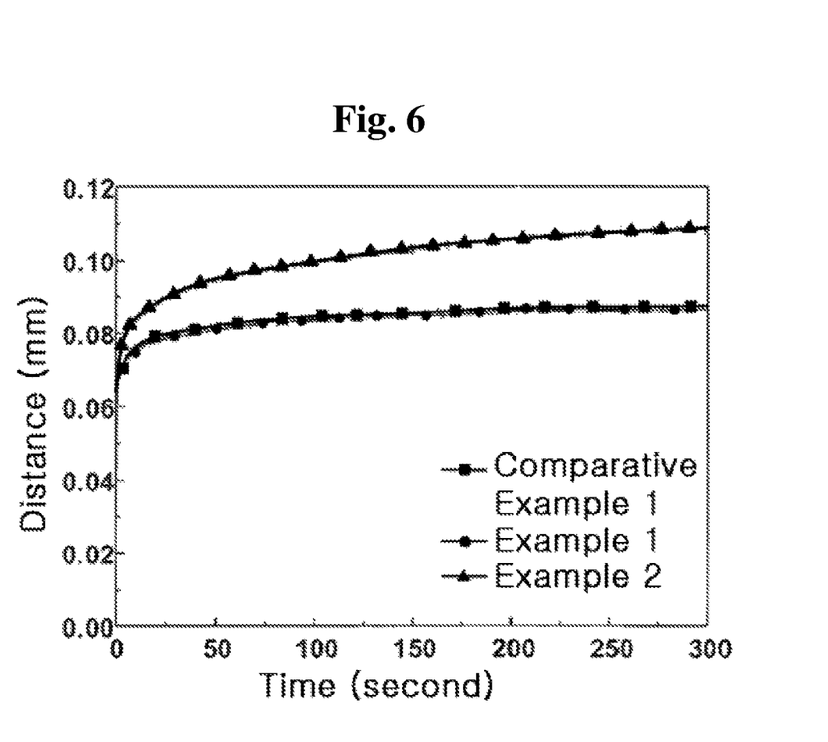
FIG. 6 is a graph showing the results of a creep test for the adhesive films prepared in Examples 1 to 2 and Comparative Example 1.

For each of the adhesive films prepared in Examples 1 to 2 and Comparative Examples 1, a degree of deformation over time was measured after application of 1000 gf to the adhesive film for 5 minutes using a texture analyzer (TA XT Plus, Stable Micro systems Co., Ltd.). Results are shown in FIG. 6.

<Bending Property>

Each of the adhesive films prepared in Examples 1 to 3 and Comparative Examples 1 to 4 was stored under high temperature and high humidity conditions (temperature: 85° C., humidity: 85%) for 24 hours, and then left at room temperature for 1 hour. Thereafter, a degree of bending was measured. Results are shown in Table 2.

<Relaxation Modulus>

Figure 7:
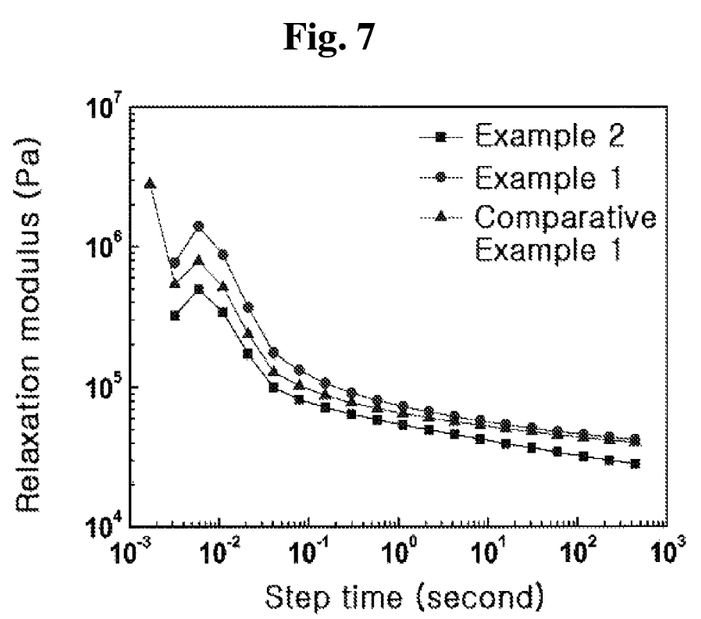
FIG. 7 is a graph showing relaxation modulus measured for the adhesive films prepared in Examples 1 to 2 and Comparative Example 1.

Each of the adhesive films prepared in Examples 1 to 2 and Comparative Example 1 was evaluated as to relaxation modulus calculated as a ratio of stress to strain. Results are shown in FIG. 7.

LIST OF REFERENCE NUMERALS 10, 20: Adhesive film
11, 21: Base layer
12, 22, 112, 222: Adhesive layer
23: Release film layer
100, 200: Touch panel
130, 230: Conductive plastic film
131, 231: Plastic base layer
132, 232: Conductive layer
240: Anti-reflection coating
250: Protective film
260: Transparent substrate
270: Liquid crystal display (LCD)

The invention claimed is:

1. An adhesive film comprising an adhesive layer comprising a cured product of a urethane acrylate-based adhesive composition for touch panels comprising a urethane acrylate-based curable compound, a (meth)acrylic acid ester monomer, and a crosslinkable monomer, wherein
the (meth)acrylic acid ester monomer is present in an amount of about 75 parts by weight to about 100 parts by weight based on 100 parts by weight of the urethane acrylate-based curable compound;
the crosslinkable monomer is present in an amount of about 50 parts by weight to about 75 parts by weight based on 100 parts by weight of the urethane acrylate-based curable compound;
the urethane acrylate-based adhesive composition having a glass transition temperature of about −20° C. to about −50° C., the cured product of the urethane acrylate-based adhesive composition has a degree of curing from 70 wt % to about 90 wt % and has a modulus of about 50,000 Pa to about 70,000 Pa, as measured at about 60° C. to about 80° C., the urethane acrylate-based curable compound is an oligomer having a weight-average molecular weight of about 30,000 to 100,000; and the crosslinkable monomer is 2-hydroxyethyl (meth)acrylate.

2. The adhesive film according to claim 1, wherein the (meth)acrylic acid ester monomer comprises alkyl(meth)acrylate, and the alkyl of the alkyl(meth)acrylate comprises a linear or branched C1 to C14 alkyl.

3. The adhesive film according to claim 1, wherein the (meth)acrylic acid ester monomer comprises one selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isobornyl (meth)acrylate, isononyl (meth)acrylate, and combinations thereof.

4. The adhesive film according to claim 1, further comprising: a photoinitiator.

5. The adhesive film according to claim 4, wherein the photoinitiator comprises one selected from the group consisting of benzoin initiators, hydroxyketone initiators, aminoketone initiators, caprolactam initiators and combinations thereof.

6. The adhesive film according to claim 1, wherein the adhesive layer has a thickness of about 25 µm to about 300 µm.

7. The adhesive film according to claim 6, wherein the adhesive film has a degree of deformation ranging from about 0.08 mm to about 0.11 mm, as measured after application of 1000 gf to the adhesive film for 5 minutes using a texture analyzer (TA XT Plus, Stable Micro systems Co., Ltd.).

8. The adhesive film according to claim 1, comprising:
a base layer; and
an adhesive layer stacked on one or both surfaces of the base layer.

9. The adhesive film according to claim 8, wherein the base layer comprises one selected from the group consisting of polyethylene terephthalate, polytetrafluoroethylene, polyethylene, polypropylene, polybutene, polybutadiene, a vinyl chloride copolymer, polyurethane, ethylene-vinyl acetate, an ethylene-propylene copolymer, an ethylene-ethyl acrylate copolymer, an ethylene-methyl acrylate copolymer, polyimide, and combinations thereof.

10. The adhesive film according to claim 8, wherein the adhesive layer and a release film are sequentially staked on one or both surfaces of the base layer.

11. A touch panel comprising:
a conductive plastic film with a conductive layer formed on one surface thereof; and
an adhesive layer attached to the conductive layer and comprising a cured product of the adhesive composition for touch panels comprising a urethane acrylate-based curable compound, a (meth)acrylic acid ester monomer, and a crosslinkable monomer, wherein the (meth)acrylic acid ester monomer is present in an amount of about 75 parts by weight to about 100 parts by weight based on 100 parts by weight of the urethane acrylate-based curable compound;

the crosslinkable monomer is present in an amount of about 50 parts by weight to about 75 parts by weight based on 100 parts by weight of the urethane acrylate-based curable compound;

the urethane acrylate-based adhesive composition having a glass transition temperature of about −20° C. to about −50° C., the cured product of the urethane acrylate-based adhesive composition has a degree of curing from 70 wt % to about 90 wt % and has a modulus of about 50,000 Pa to about 70,000 Pa, as measured at about 60° C. to about 80° C., the urethane acrylate-based curable compound is an oligomer having a weight-average molecular weight of about 30,000 to 100,000; and the crosslinkable monomer is 2-hydroxyethyl (meth)acrylate.

12. The touch panel according to claim 11, wherein the conductive plastic film is a polyethylene terephthalate film with an ITO (conductive metal oxide) layer formed on one surface thereof.

* * * * *